(12) United States Patent
Mitchell

(10) Patent No.: US 12,703,628 B2
(45) Date of Patent: Aug. 11, 2026

(54) APPARATUS AND METHOD FOR ISOLATING HYDROGEN FROM WATER

(71) Applicant: RAYTHEON TECHNOLOGIES CORPORATION, Farmington, CT (US)

(72) Inventor: James P. Mitchell, Cedar Rapids, IA (US)

(73) Assignee: RTX CORPORATION, Farmington, CT (US)

( * ) Notice: Subject to any disclaimer, the term of this patent is extended or adjusted under 35 U.S.C. 154(b) by 584 days.

(21) Appl. No.: 18/331,129

(22) Filed: Jun. 7, 2023

(65) Prior Publication Data

US 2024/0409401 A1 Dec. 12, 2024

(51) Int. Cl.

| | |
|---|---|
| ***C01B 3/00*** | (2026.01) |
| ***B04B 5/10*** | (2006.01) |
| ***C01B 3/042*** | (2026.01) |

(52) U.S. Cl.

CPC ................ *C01B 3/042* (2013.01); *B04B 5/10* (2013.01)

(58) Field of Classification Search

None

See application file for complete search history.

(56) References Cited

U.S. PATENT DOCUMENTS

| | | | |
|---|---|---|---|
| 4,071,608 | A | 1/1978 | Diggs |
| 4,233,127 | A | 11/1980 | Monahan |
| 4,332,775 | A | 6/1982 | Genequand et al. |
| 4,405,594 | A | 9/1983 | Pyle |
| 6,521,205 | B1 | 2/2003 | Beck |
| 9,079,772 | B2 | 7/2015 | Bar-Gadda |
| 11,421,161 | B2 | 8/2022 | Lynn |

FOREIGN PATENT DOCUMENTS

| | | | |
|---|---|---|---|
| CA | 2301219 | A1 | 11/1999 |
| DE | 202020005826 | U1 | 9/2022 |
| WO | 2010/053387 | A1 | 5/2010 |

OTHER PUBLICATIONS

European Search Report for EP Application No. 24180844.3 dated Nov. 15, 2024.

European Search Report for EP Application No. 24180766.8 dated Nov. 15, 2024.

European Search Report for EP Application No. 24180809.6 dated Nov. 15, 2024.

*Primary Examiner* — Stefanie J Cohen

(74) *Attorney, Agent, or Firm* — Carlson, Gaskey & Olds, P.C.

(57) ABSTRACT

A method of isolating hydrogen from water in a reactor includes charging a centrifuge with water via an inlet including an inlet valve. The centrifugal centrifuge is situated in a protective chamber. The method also includes heating the centrifuge such that at least some of the water splits into hydrogen and oxygen, rotating the centrifuge within the protective chamber such that the hydrogen and oxygen separate within the centrifuge according to their molecular mass, and drawing off at least some of the hydrogen from the centrifuge via an outlet including an outlet valve.

20 Claims, 10 Drawing Sheets

1216
1216b
1216a
208
1218

202
2A
208
216
204
216
210
214
1216
210
206
208
1216
222
209
220
2A
210
218

200

202
204
216
214
206
208
210
210
208
211
222
212
220
218
209
210
200'

APPARATUS AND METHOD FOR ISOLATING HYDROGEN FROM WATER

BACKGROUND

Hydrogen is a potential "clean" energy carrier alternative to many other traditional energy sources. However, hydrogen is not available in abundance naturally and therefore must be isolated from other compounds such as water. Conventional isolation techniques require the input of energy, which decreases sustainability of the isolation process and resulting hydrogen. Additionally, conventional isolation techniques may not be suitable for large-scale production of hydrogen because of the need for extreme operating conditions such as very high temperatures and/or pressures, chemical processes, electrical inputs and/or combinations thereof. Accordingly, there is a need for a more efficient, sustainable, and scalable apparatus and method for isolating hydrogen.

In addition, some current hydrogen isolation techniques are not suitable for local or mobile hydrogen production because of safety concerns and/or practicability of building the required systems. Accordingly there is a need for a system that can produce hydrogen on a just-in-time basis for local use, avoiding transport logistics and associated energy losses.

SUMMARY

A method of isolating hydrogen from water in a reactor according to an exemplary embodiment of this disclosure, among other possible things includes charging a centrifuge with water via an inlet including an inlet valve. The centrifugal centrifuge is situated in a protective chamber. The method also includes heating the centrifuge such that at least some of the water splits into hydrogen and oxygen, rotating the centrifuge within the protective chamber such that the hydrogen and oxygen separate within the centrifuge according to their molecular mass, and drawing off at least some of the hydrogen from the centrifuge via an outlet including an outlet valve.

In a further example of the foregoing, the inlet valve and the outlet valve are closed during the heating.

In a further example of any of the foregoing, the method includes opening the outlet valve at a predetermined time interval after the heating.

In a further example of any of the foregoing, the method includes closing the outlet valve at a predetermined time interval after opening the outlet valve.

In a further example of any of the foregoing, the hydrogen in the outlet is approximately pure.

In a further example of any of the foregoing, drawing off the oxygen and recombined water from the centrifuge via an oxygen release line including an oxygen release valve.

In a further example of any of the foregoing, the method includes drawing off the oxygen and recombined water is performed after drawing off the hydrogen.

In a further example of any of the foregoing, the method includes re-charging the centrifuge with water after drawing off the oxygen and recombined water.

In a further example of any of the foregoing, the oxygen release valve is open during the re-charging.

In a further example of any of the foregoing, the method includes pulsing the oxygen release valve prior to drawing off the hydrogen.

In a further example of any of the foregoing, the heating is to a temperature of at least about 2200 degrees C.

In a further example of any of the foregoing, the heating to is to a temperature of at least about 3000 degrees C.

In a further example of any of the foregoing, the heating to is to a temperature of at least about 4000 degrees C.

In a further example of any of the foregoing, drawing off the hydrogen is from an approximate radial center of the centrifuge.

In a further example of any of the foregoing, the method includes preheating the water prior to the charging.

In a further example of any of the foregoing, the method includes circularly accelerating the water prior to the charging.

In a further example of any of the foregoing, the protective chamber is under vacuum.

In a further example of any of the foregoing, the method includes providing a noble gas to the centrifuge such that the noble gas forms a layer along a wall of the centrifuge.

In a further example of any of the foregoing, the heating is at least in part by a solar-powered laser.

In a further example of any of the foregoing, the method includes moving the reactor from a first location to a second location.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Hydrogen production typically uses chemical or electrical hydrolysis methods, which processes are known to exhibit significant waste heat loss that reduce the achievable efficiency of energy recovery. It is known that hydrogen and oxygen atoms split from one another when heated (known as "thermolysis" or "thermosplitting"), however, thermolysis has not been taken advantage of as a viable method of large-scale hydrogen production to date because of the high temperature requirements and associated challenges with designing and producing equipment capable of withstanding the required operating conditions. More specifically, hydrogen and oxygen atoms in water begin to split from one another at about 2000 degrees C. (3632 degrees F.). At temperatures of about 2200 degrees C. (3992 degrees F.) about 3% of water atoms in a given quantity of water split. At temperatures of about 3000 degrees C. (5432 degrees F.), more than about 50% of the water atoms in a given quantity of water split. At temperatures of about 4000 degrees C. (7232 degrees F.), about 100% of water atoms in a given quantity of water split. During these conditions H, $H_2$, O, $O_2$, and OH and other reaction products like $H_2O_2$ or $HO_2$ are present and have masses that greatly differ.

Moreover, in addition to providing the proper conditions for thermosplitting to occur, the hydrogen must be efficiently physically isolated from remaining water and oxygen atoms and other reaction products in order to be usable as a bulk energy source.

Figure 1:
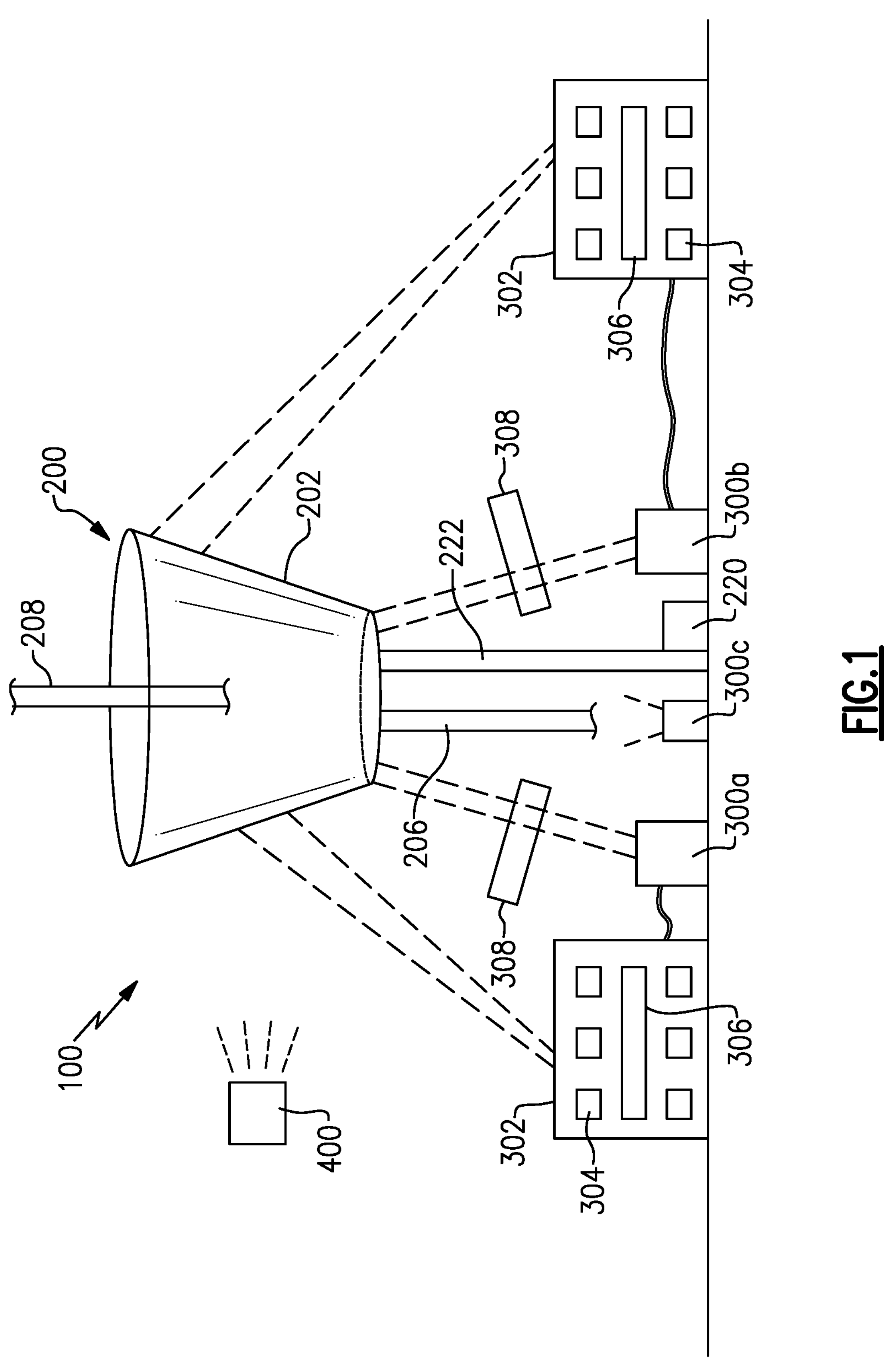
FIG. 1 schematically shows a system for isolating hydrogen from water.

Accordingly, FIG. 1 shows a system 100 for isolating hydrogen from water. While the system 100 is described with respect to processing water, it should be understood that the system 100 could be used for processing other materials in a similar manner in other examples. The system 100 is generally an enclosed (non-atmospheric) system for splitting hydrogen and oxygen from water under pressure and isolating the hydrogen. It should be understood that "water" as used herein includes liquid, gaseous, or supercritical $H_2O$. The system 100 includes a reactor 200 and an energy source 300 operable to heat the reactor 200 that is near or surrounding the reactor 200. In a particular example the energy source 300 may provide a green and sustainable energy for providing heat to the reactor 200, and specifically enough heat to facilitate the splitting of water. In some examples the system 100 can be implemented at a location where hydrogen is to be used as an energy carrier, eliminating the need for transporting the hydrogen, which could require costly and complex processes such as compressing and/or cryogenically cooling the hydrogen to a liquid form. In this example, the system 100 may include hydrogen storage equipment as would be known in the art for local storage and use of the hydrogen as fuel. In a more particular example, the system 100 could be mobile or semi-mobile and could be transported to the location at which hydrogen is needed.

In some examples the system includes a controller 400 operable to control various aspects of the system such as the motor and valves which are discussed in detail below. The controller 400 may be operable to receive inputs from an operator that is remote from the controller 400 and system 100. Such controllers are known in the art and will not be described in detail herein.

Figures 2, 2A:
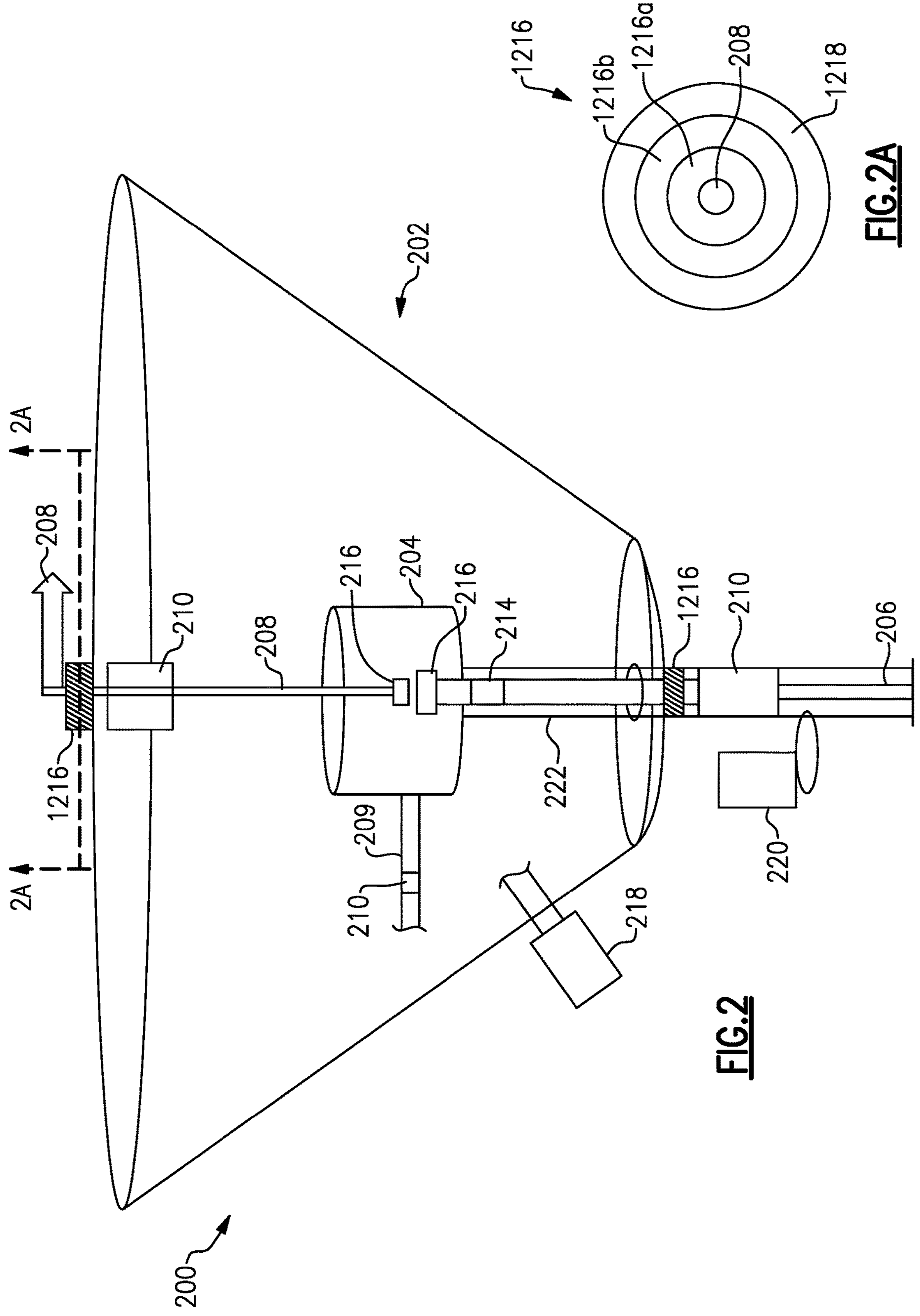
FIG. 2 schematically illustrates a reactor for the system of FIG. 1.
FIG. 2A schematically illustrates a section view of a fluid bearing in the system of FIG. 1.

The reactor 200, shown in FIG. 2, includes a mechanical centrifuge 204 situated in a protective chamber 202 and configured to rotate within the protective chamber 202, a water inlet 206 fluidly connected with the centrifuge 204 and operable to provide water from a water source (not shown) to the centrifuge 204, and a hydrogen outlet 208 fluidly connected to the centrifuge 204 and by which pure or approximately pure hydrogen is removed from the centrifuge 204. The inlet 206 and/or outlet 208 may be configured to rotate with the centrifuge 204 or could be stationary with respect to the inlet 206 and/or outlet 208.

In the example of FIG. 1, the reactor 200 is situated on a tower but it could instead be used in other applications or locations. Moreover, in FIGS. 1-2 the centrifuge 204 has a vertical orientation in which it is configured to rotate about an axis that is substantially perpendicular (e.g., within 5 degrees, 10 degrees from a vertical axis) to the ground. In other examples, however, the centrifuge 204 can have a substantially horizontal orientation (e.g., within 7 degrees, 15 degrees from a horizontal axis) in which it is configured to rotate about an axis substantially parallel to the ground.

The protective chamber 202 in FIGS. 1-2 has a tapered shape but in other examples can have a cylindrical or another shape.

The protective chamber 202 protects the centrifuge 204 from oxidation resulting from exposure to ambient conditions. The protective chamber 202 also captures indirect and radiant heat from the energy source 300 which is operable to heat the reactor 200. The protective chamber 202 develops and evens distribution of heat provided to the centrifuge 204 from the energy source 300, reducing the propensity for destructive hot spots to form.

In some examples vacuum conditions may be provided in the protective chamber 202 by a pump or pumping and pressure regulation system 218 as would be known in the art. The vacuum conditions reduce heat loss from reactor 200 and in particular centrifuge 204 to the atmosphere or by radiation to protective chamber 202 and minimize external oxidation of the centrifuge 204 by reducing its contact with surrounding oxygen in air. The vacuum conditions may also protect thermal energy transferred from the energy source 300 to the centrifuge 204. In another example, the protective chamber 202 is pressurized with an inert gas such as a noble gas by pumping and pressure regulation system 218. The pressure of the inert gas may be regulated to be higher than the pressure of hydrogen exiting the outlet 208. Therefore, the inert gas counters the propensity of hydrogen leakage within the reactor 200 such as at valves 210 or fittings 216 (discussed below). Like vacuum conditions, the inert gas also minimizes opportunities for oxidation of the centrifuge 204 by reducing its contact with surrounding air.

In the example of FIG. 2, the inlet 206 interfaces with the reactor 200 at a bottom side of the reactor while the outlet 208 interfaces with the reactor at a top of the reactor 200. In another example system with an alternate reactor 200', shown in FIG. 3, the outlet 208 is arranged concentrically inside in the inlet 206, and both the inlet 206 and the outlet 208 are arranged on the bottom side of the reactor 200.

The inlet 206 and/or outlet 208 may include valves 210 such as check valves to control the flow of water into the centrifuge 204 and hydrogen out of the centrifuge 204, respectively, as will explained in more detail below. The outlet 208 may include an oxygen release line 212 (shown in FIG. 3 though equally applicable to the example of FIG. 2) to release any oxygen present in the outlet 208. In some examples recombined or unsplit water may also be present in the outlet 208 and would enter the oxygen release line 212. In this respect the outlet 208 includes any sort of condenser or separator 211 known in the art for capturing unprocessed water and separating or releasing oxygen. The condenser or separator 211 is upstream from valves 210 on the outlet 208 and release line 212. The valves 210 and outlet 208/oxygen release line 212 may comprise high temperature materials such as those used for fittings 216, discussed below.

In some examples valuable heat from the oxygen release line 212 may be recaptured and used to contribute to preheating water at the inlet 206 according to any known heat exchanging method. One particular example is physical conduction of the heat, e.g., via mechanical contact of the separate inlet 206 an outlet 208 or proximity of the release line 212 to the inlet 206. This can be, for example, effectuated by the concentric arrangement of inlet 206/outlet 208 shown in FIG. 3 and discussed above, or by other piping arrangements.

In a particular example, water in inlet 206 is heated and/or pressurized before it reaches the centrifuge 204 to provide a supercritical fluid by any suitable pumping system known in the art. In a more particular example, the water may be pressurized to above about 1000 psi. The water may also be pre-accelerated by one or more optional rotational or mechanical accelerators 214 within the inlet 206 to encourage pre-rotation of the water before or as it enters the centrifuge crucible 204. The pre-rotation helps speed up the separation process and reduces the need for mechanical blades or mass communicators within centrifuge 204, which can oxidize in the presence of oxygen at high temperatures. The accelerator 214 is shown schematically in FIGS. 2 and 3 but could be in any form known in the art, such as baffles or other mass communicators that assist in introducing a spin into a fluid flow.

In some examples the water entering at inlet 206 may include thermosplitting chemical additives which are known to direct thermolysis. For example, chemicals that reduce the temperature at which splitting occurs may be added to the water. These chemicals may be introduced at any point prior to the water being delivered into the centrifuge 204 via the inlet 206.

The protective chamber 202 and centrifuge 204 both comprise one or more ultra high-temperature materials, e.g., one that is capable of withstanding temperatures of at least about 2200 degrees C., and in more particular temperatures of at least about 3000 degrees C. or in a more particular example temperatures of at least about 4000 degrees C. That is, the ultra high-temperature material when used for the reactor 200 does not experience a significant change in its material properties at the foregoing temperatures. The ultra high-temperature material has high mechanical strength, good corrosion resistance at high temperatures, is generally not subject to oxidation at operational conditions of the centrifuge 204, generally has low- or non-reactivity with respect to water, oxygen, and hydrogen, and/or has good blackbody thermal conductivity.

For instance one or both of the protective chamber 202 and centrifuge 204 include refractory materials (which may be metals or ceramics) such as tungsten or tungsten alloys like Tungsten 3422C. Refractory metal carbides such as Tungsten Carbide 2870C, Hafnium Carbide 3900C, Tantalum Hafnium Carbide 3905C. Tantalum Carbide 3768C, and Tantalum Hafnium CarbonNitride Ta,Hf,CN 4027C and the like are also contemplated. Some of these materials are known to have ultra high-temperature anti-corrosive capabilities as well as extremely high mechanical strength.

In some examples the protective chamber 202 and/or centrifuge 204 includes a protective but optically transparent ultra high-temperature coating such as quartz glass or diamond like carbon (DLC) coating.

Methods of fabricating the system 100 components from such materials are known in the art, such as sintering processes, spark plasma additive manufacturing, and high-temperature self-propagating synthesis or combustion synthesis. In some particular examples the fabrication method is selected to maximize the thermomechanical integrity of the material, for instance, by selecting and encouraging epitaxial growth of the material crystals by any method known in the art. In a particular example the microstructure of the system 100 components is selected and oriented to maximize the mechanical properties of the system 100 components.

A motor 220 such as an electric motor is operable to rotate the centrifuge 204 via a driveshaft 222. In some examples the driveshaft 222 is concentric with the water inlet 206 as shown schematically in FIGS. 2 and 3. The water inlet 206 may run through the drive shaft 222, or vice versa. In other examples the water inlet 206 could be at a different location. In still further examples, a mechanically belted or mechanically chained or geared system could be used in place of or in conjunction with the driveshaft 222 as are well known in the art. Furthermore, the motor 220 may be any electrical winding style digital, brushless, continuous, pneumatic, fluid-driven, fixed-speed motor, or variable speed motor, and may in some examples be computer-adapted to monitor and control speed of the centrifuge 204 to optimize conditions within the centrifuge 204. Though in the examples shown the motor 220 is implemented outside of the protective chamber 202, in other examples the motor 220 could be situated in the protective chamber 202 or even in the centrifuge 204. Motor 220 components may include touchless magnetic drive concepts and include super conducting motor technologies.

The reactor 200 may include various fittings 216 such as fittings for facilitating rotation of certain elements, such as the centrifuge 204, relative to stationary elements, such as the protective chamber 202, and simultaneously allow pass-through of fluid. For instance, fittings 216 include bearings or rotary unions at the connection between inlet 206 and/or outlet 208 and the centrifuge 204. In one example, the fittings 206 comprise an ultra high-temperature material such as those discussed above. In other examples the fittings 216 may comprise a high-temperature material, e.g., one that is capable of withstanding temperatures of up to about 1000 degrees C. That is, the high-temperature material when used for the fittings 216 does not experience a significant change in its material properties at the foregoing temperatures. As some of the fittings 216 are not exposed to the highest temperatures present inside the reactor itself, high temperature materials may be suitable for some fittings 216 in this example. Some example high-temperature materials are high melting temperature and corrosion-resistant noble metals such as Platinum 1773C, Palladium 1555C, Rhodium 1963C, Iridium 1821C, and/or the like.

One example fitting is a fluid bearing 1216 (FIG. 2) at the interface of the reactor 200 with the inlet 206 and the outlet 208. Fluid bearings are known in the art but one example will briefly be described herein. FIG. 2A shows a section view of the fluid bearing 1216 along the line 2A in FIG. 2. The fluid bearing 1216 includes an inner ring **1216*a* and an outer ring 1216*b*. The inner ring 1216*a* is attached to and rotatable with the outlet 208. The outer ring 1216*b* is connected to the stationary protective chamber 202. A fluid collector 1218 surrounds the fluid bearing 1216 to collect any fluid leaked around the fluid bearing 1216. This reduces fluid loss as well as heat loss since the heat in the leaked fluid is kept near the reactor 200. In FIG. 2A, fluid bearing 1216 is at the outlet 208 however it should be understood that the same description applies to a fluid bearing 1216 at the inlet 206**.

In operation, the centrifuge 204 is heated to a temperature above about 2200 degrees C. by the energy source 300. In this temperature range, the electrical bonds of water molecules become less significant, allowing for initial bulk separation of hydrogen atoms from oxygen atoms. In particular the centrifuge crucible 204 is heated to a temperature of above about 3000 degrees C. by the energy source 300. In a further example, the centrifuge is heated to a temperature of about 4000 degrees C.

Figure 3:
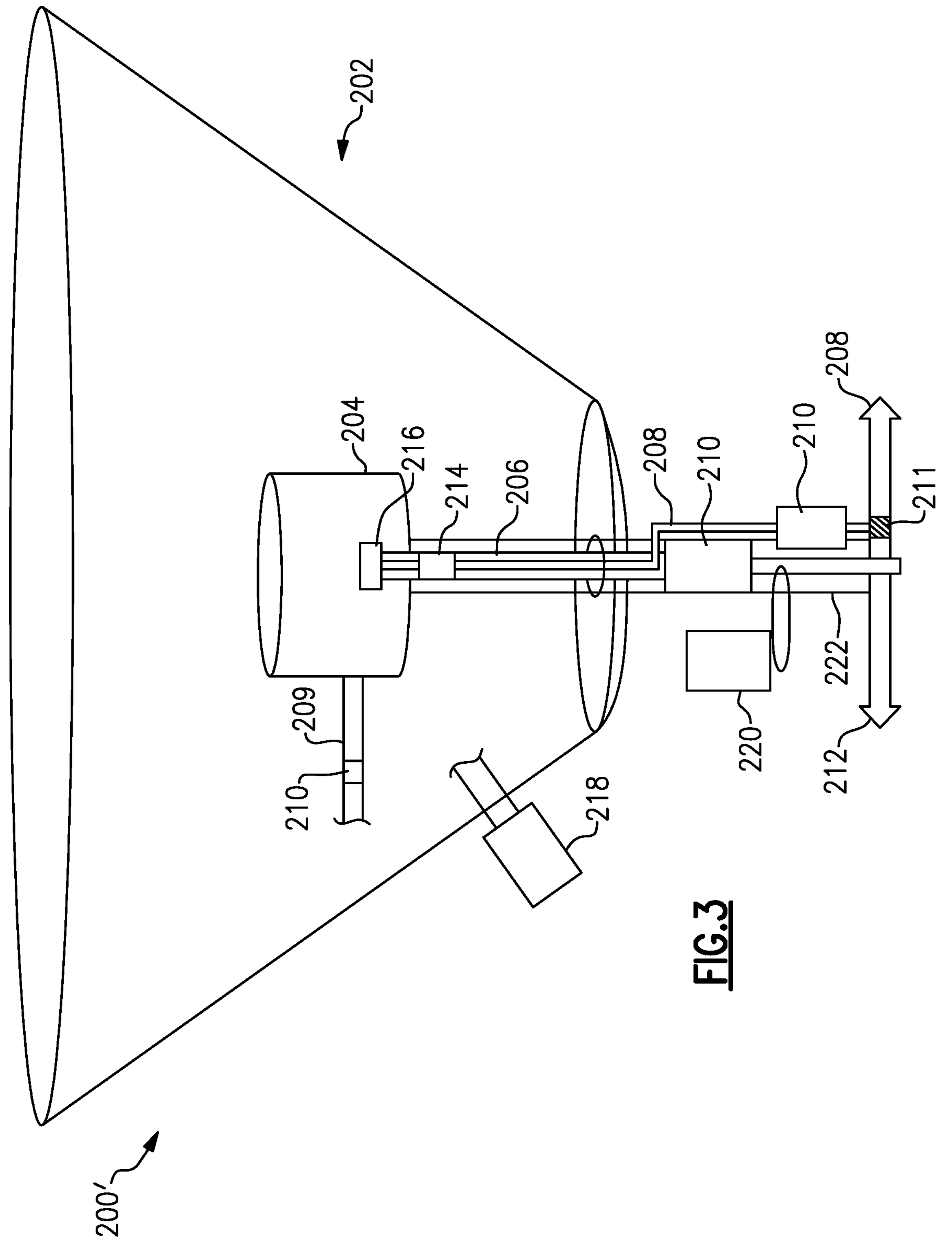
FIG. 3 schematically illustrates an alternative reactor for the system of FIG. 1.
Figure 4:
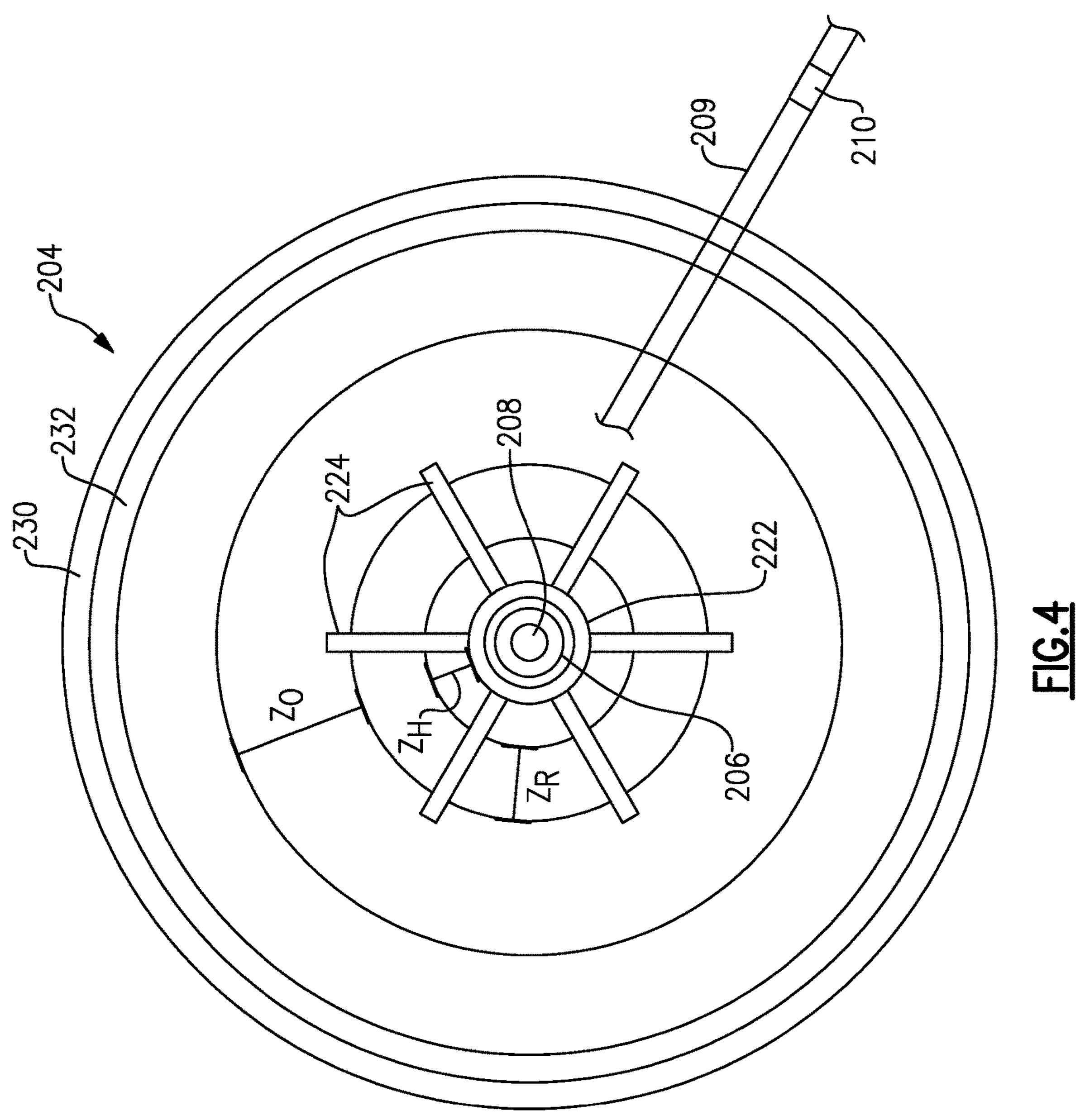
FIG. 4 schematically illustrates a top view of centrifuge of the reactor of FIG. 2 or 3 in operation.

The centrifuge 204 is rotated via the driveshaft 222 as discussed above. FIG. 4 shows a cross-section of the centrifuge 204 when it is rotating and heated as discussed above. In the example of FIG. 4 the outlet 208 is concentric with the inlet 206 as in the example of FIG. 3 discussed above, however it should be understood that the FIG. 4 illustration is equally applicable to the FIG. 2 example and other examples discussed herein. The rotation forces the lightest mass constituents in the centrifuge 204 towards the radial center of the centrifuge 204 and the heaviest constituents towards the outer diameter of the centrifuge 204 (e.g., the centrifuge 204 wall). In a particular example, the rotation is at speeds of up to about 1000 RPM.

In some examples one or more baffles 224 (FIG. 4) are provided in the centrifuge 204 to encourage quicker mass transfer within the centrifuge 204. The baffles 224 are in one example a series of spokes extending radially from the center of the centrifuge crucible 204. The baffles 224 could comprise the same ultra high-temperature material discussed above or in other examples could comprise another ultra high-temperature material.

After heating and bulk separation, the lightest mass constituent within the centrifuge 204 is liquid or supercritical elemental hydrogen. The hydrogen is forced towards the radial center of the centrifuge 204 due to rotational action of the centrifuge 204 according to well-known principles of centrifuge operation. In one example the hydrogen could include the hydrogen isotope deuterium or tritium. The hydrogen congregates in a hydrogen zone $Z_H$ about the radial center. The outlet 208 is situated in $Z_H$ and in particular at about the radial center of the centrifuge 204 so that the purest hydrogen in the centrifuge 204 flows out of the hydrogen outlet 208. Oxygen congregates in an oxygen zone $Z_O$ surrounding the hydrogen zone $Z_H$. A recombination zone $Z_R$ may form between the hydrogen zone $Z_H$ and oxygen zone $Z_O$ where oxygen and hydrogen naturally tend to recombine to form water (which may be in a supercritical state depending on the operating conditions).

In a particular example, the centrifuge 204 includes one or more oxygen vents 209 that extend into the oxygen zone $Z_O$. The oxygen vents 209 allow for pressure release from the centrifuge 204. In a particular example, the oxygen vents 209 each include a valve 210 for controlling pressure in the centrifuge 204, which in turn is related to the splitting efficiency for water within the centrifuge 204 along with its rotational speed.

In one example a heavy (high molecular weight) inert gas such as one of a noble gas Argon, Xenon, and/or Krypton is provided to the centrifuge 204, either with the water in inlet 206 or via a separate inlet (not shown). When the centrifuge 204 spins, the high mass gas is forced (manifests) to the wall of the centrifuge 204 because it is the highest mass of any other constituents in the centrifuge 204 and forms a layer or film 232 (FIG. 4) there. Because of the inert nature of the heavy gas it does not react or combine with the other constituents in the centrifuge 204. The film 232 can serve as a protective barrier for the centrifuge 204. The film can also assist in distributing heat evenly throughout the centrifuge 204 as it is conducted into the centrifuge 204. In the latter example where the high mass inert gas is provided in the inlet 206, it may form a film around a wall of the inlet just like the film 232 around the wall of the centrifuge 204 by virtue of centrifugal forces due to rotation of the inlet 206 with the centrifuge 204. In this example the high mass inert gas provides similar protections to the inlet 206. In some examples any escaped or expelled inert gas is recycled to the centrifuge 204.

Alternatively or additionally to the high mass inert gas, an elemental metal that is inert to water, hydrogen, and oxygen and that exists in a liquid state at the operating temperature of the centrifuge 204 is provided in the centrifuge 204. One example is gold and another is platinum. During heating of the centrifuge 204 to operating temperatures, the metal melts and due to its high molecular weight forms a protective film or layer 230 on the centrifuge 204 wall that remains in the liquid state. In examples where the high mass inert gas is also used, gold has a higher molecular weight than the noble gas(ses) and thus forms a metal layer 230 at the centrifuge 204 wall while the noble gas forms a layer 232 just inside the metal layer 230 (e.g., layer of gold). The metal layer 230 provides an additional measure of corrosion protection for the centrifuge 204.

In a particular example the noble gas(ses) and/or metal are implemented in a centrifuge 204 configured to rotate about an axis that is substantially parallel to the ground as discussed above. In this example, gravity more evenly acts on the centrifuge 204 and in particular the centrifuge wall 204, thus allowing for more even distribution of the noble gas(ses) layer 232 and/or metal layer 230.

FIG. 4 schematically shows a metal layer 230 and noble gas layer 232 in the centrifuge 204, however as noted above it should be understood that a metal layer 230 could be used on its own, the noble gas layer 232 could be used on its own, or neither could be used.

Figure 5:
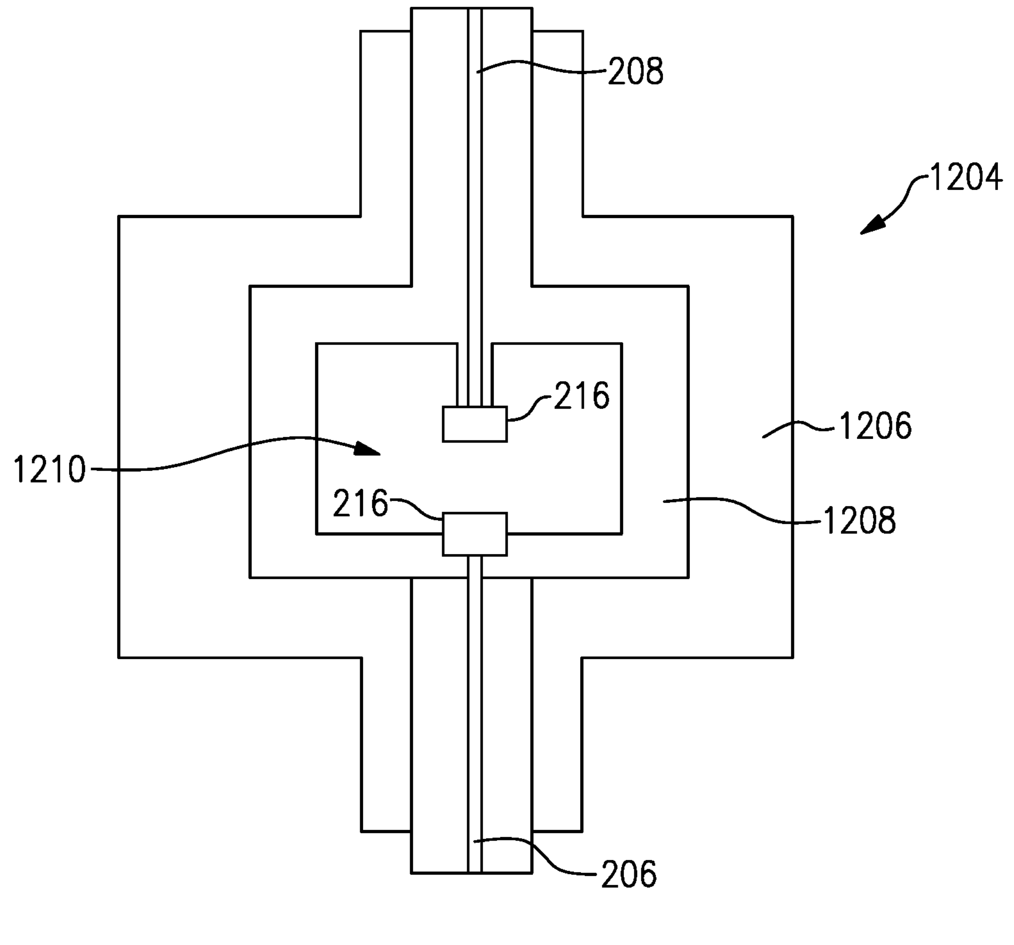
FIG. 5 schematically illustrates a side view of an alternative centrifuge for the system of FIG. 1.

FIG. 5 shows another example centrifuge 1204. In this example, the centrifuge 1204 includes an outer shell 1206 comprising any of the ultra high-temperature materials discussed above, such as a refractory material or more particularly a tungsten-containing material. The centrifuge 1204 also includes an inner shell 1208 which comprises the same or different ultra high-temperature material. In one example the material of the outer shell 1206 is selected to maximize its energy-absorbing properties. The inlet 206/outlet 208 are fluidly connected with a void 1210 in the inner shell 1208 via fittings 216 and may be manufactured as one continuous piece with the inner shell 1208 or assembled such that very high pressures serve to force closure of any connection seams. The fittings 216 and/or inlet 206/outlet 208 may also comprise an ultra high-temperature material and may be integral with the inner shell 1208 in some examples and may provide additional mechanical strengthening geometry between the tubes and centrifuge while minimizing thermal conduction to each of the outlet ends. The inner shell 1208 may include a coating such as the quartz or DLC coatings discussed above.

In a more particular example, the inner shell 1208 can be manufactured with a sacrificial centerpiece. The inner shell 1208 may be grown onto the sacrificial centerpiece according to any known method. Then, the sacrificial centerpiece is dissolved or melted away, leaving behind a unitary, single-piece inner shell 1208 with a void 1210 in which separation occurs as discussed above.

Though in the example of FIGS. 2-5 the centrifuge 204 is cylindrical, other shapes are also contemplated. For instance the centrifuge 204 could be disc-shaped, e.g., having a relatively short axial length compared to its radius. The disc-shaped centrifuge 204 has improved centrifugal advantage compared to a cylindrical centrifuge and due to its geometry may be better suited for use with certain energy sources 300 such as those configured to provide heat to the top and/or bottom of the disc.

Figure 6:
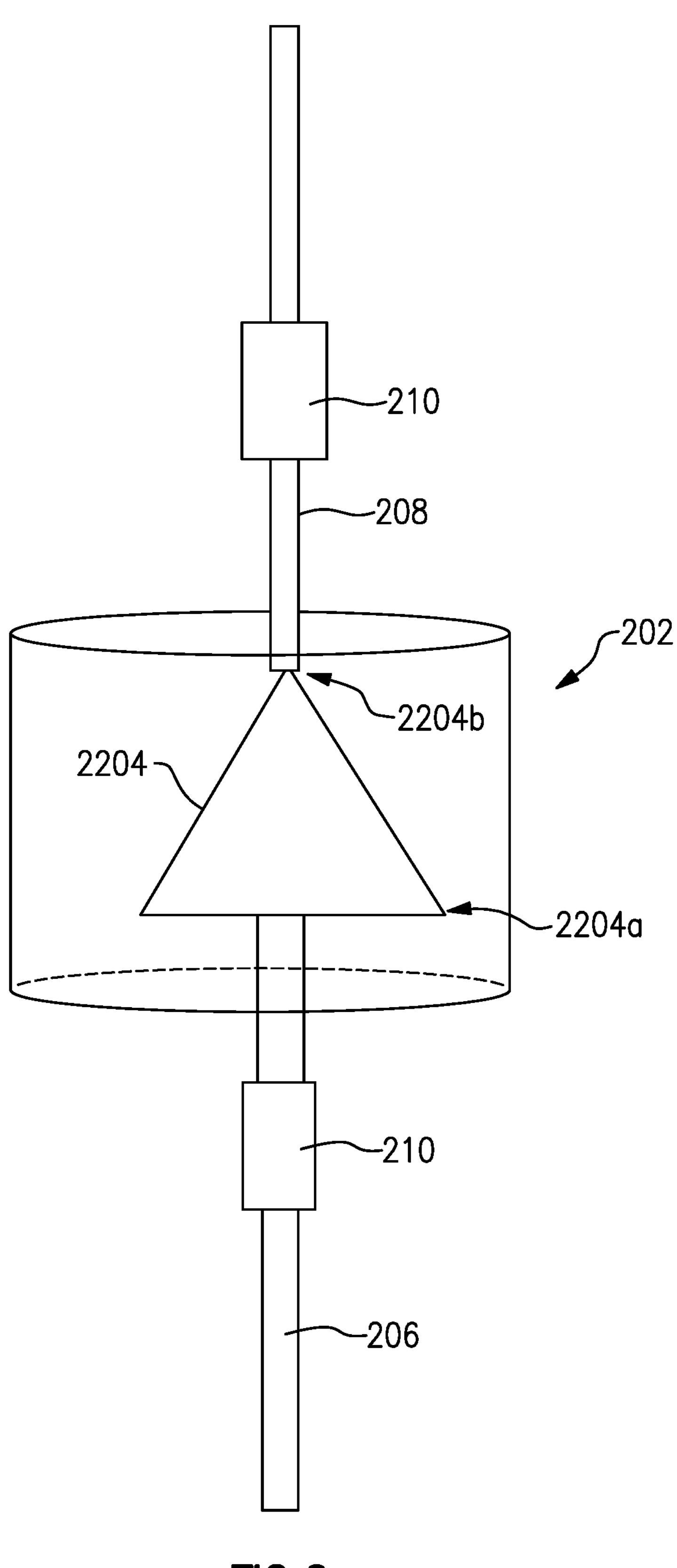
FIG. 6 schematically illustrates a side view of another alternative centrifuge for the system of FIG. 1.

In another example, FIG. 6 shows a reactor 200 with a generally conical pyramid-shaped centrifuge 2204. The conical pyramid-shaped centrifuge 2204 is oriented so that its base 2204*a* is nearest the direction of gravity or ground and its peak 2204*b* is above the base 2204*a* with respect to the ground. The base 2204*a* may be in a plane that is generally parallel to the ground or may be somewhat angled with respect to the ground. Spinning of the pyramid-shaped centrifuge 2204 causes separation of constituents within according to molecular weight in the same way as for the examples in FIGS. 2-5 except that the lightest component is not only in the radial center of the centrifuge 2204 but also rises towards the peak 2204*b* by a combination of centrifugal forces and gravity. In this example, the outlet 208 can connect to the pyramid-shaped centrifuge 2204 at the peak 2204*b* and either does not extend into the pyramid-shaped centrifuge 2204 at all or only extends into the pyramid-shaped centrifuge crucible 2204 minimally. Therefore the outlet 208 is protected from corrosion and extremely high temperatures within the pyramid-shaped centrifuge 2204.

Figure 7:
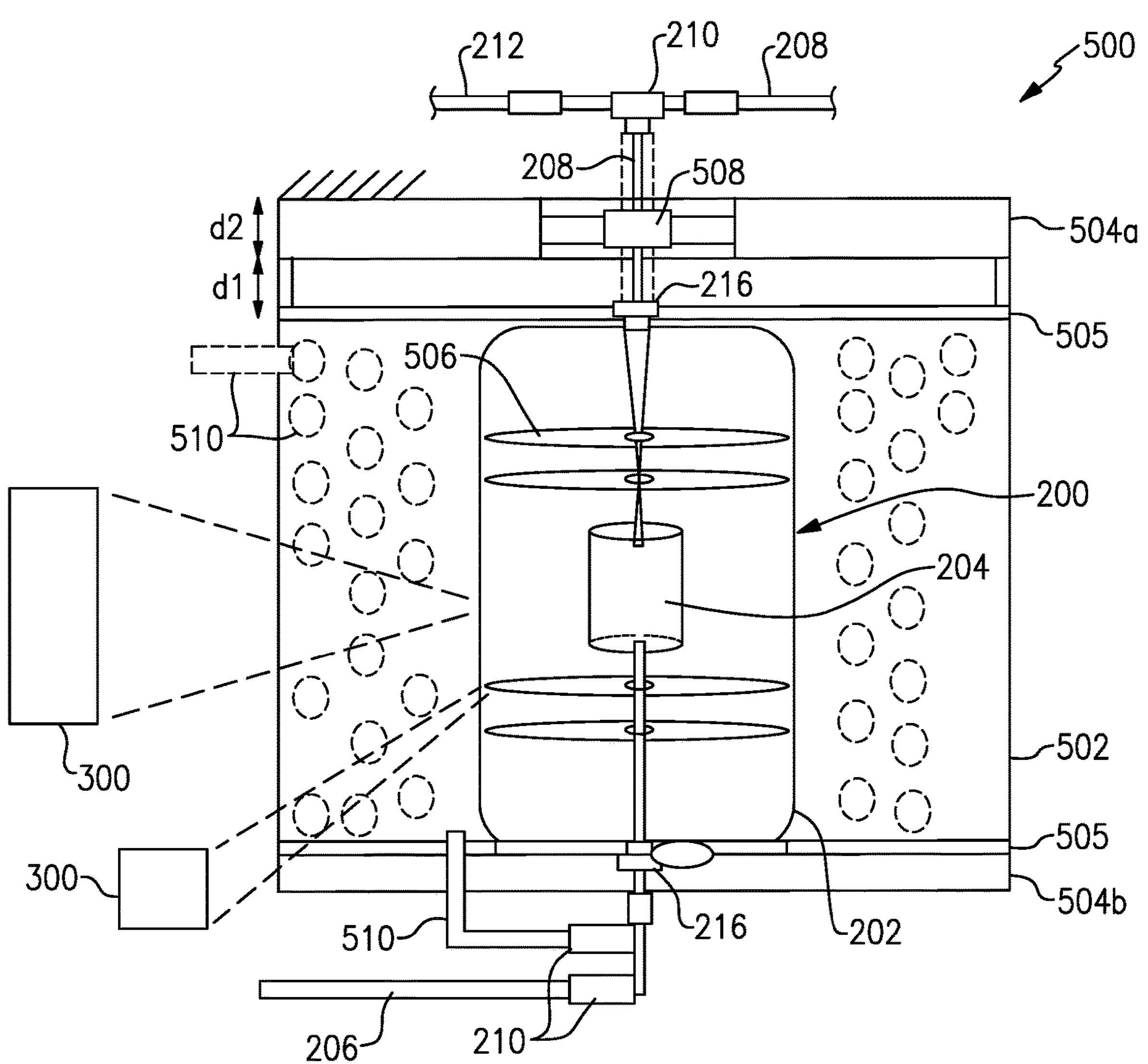
FIG. 7 schematically illustrates a reactor for the system of FIG. 1 with a heat recapture system.

FIG. 7 shows the reactor 200 situated in a heat recapture system 500 receiving heat from energy source 300, which may include lasers, solar fields, other energy sources, and combinations thereof as discussed below. In FIG. 7, the centrifuge 204 is shown situated in the protective chamber 202, however, it should be understood that any of the example centrifuges discussed above could be used with the heat recapture system 500. Moreover, in FIG. 7, the heat recapture system 500 surrounds the reactor 200. It should be understood that the other examples the reactor 200 may be only partially situated in the heat recapture system 500 and optionally may be partially situated in other casing structures. The heat recapture system 500 includes a jacket 502 surrounding the protective chamber 202. The jacket 502 acts as a thermally conductive heat distribution sink with respect to the hottest elements of the reactor 200 and therefore allows for the use of lower-temperature components for elements of the reactor 200 such as valves 210 which may be situated advantageously external to the protective chamber 202. At the same time the jacket 502 acts as thermal insulation to contain heat within the protective chamber 202, reduce the heat/energy loss and requirements for the reactor 200, and thus improve the energy efficiency of the reactor 200.

The jacket 502 includes end cap systems 504*a*/504*b* at the top and bottom of the jacket 502, respectively, which act as heat isolation shields and provide further heat protection for lower-temperature components external to the protective chamber 202 as well as contain heat within the protective chamber 202 like the jacket 502. The end caps 504*a*/504*b* may comprise ultra high-temperature materials or high-temperature materials such as the examples discussed above. Additional heat shields 505 could be used between the end caps 504*a*/504*b* and the centrifuge 204. The additional heat shields 505 contribute to the protective and insulating effects of the end caps 504*a*/504*b* and also assist in containing reflected radiative energy from the centrifuge 204. The additional heat shields 505 include access holes which allow rotation/pass-through of the inlet 206 and outlet 208 with respect to the heat shields 505.

In the example of FIG. 7, the outlet 208 geometry is tapered from a small diameter at its terminus inside the centrifuge 204 to a larger diameter as it exits the protective chamber 202. The increase in diameter facilitates a reduction in heat and pressure of the hydrogen in the outlet 208 as it exits the centrifuge 204 and protective chamber 202. This keeps heat losses from the hydrogen within the protective chamber 202. Moreover, the cooled and depressurized hydrogen can be transported throughout the system 100 using lower temperature components. Though other figures discussed herein show a straight outlet 208, it should be understood that the tapered outlet 208 could be used in any of the other examples discussed herein.

One or more heat shields 506 could also be used inside the protective chamber 202 along the inlet 206 and/or outlet 208 which comprise the ultra high-temperature materials discussed above. In the example of FIG. 7 two heat shields 506 are arranged between the centrifuge 204 and the top end cap 504*a* along the outlet 208 and two heat shields 506 are arranged between the centrifuge 204 and the bottom end cap 504*b* along the inlet 206, however more or less heat shields 506 could be used. The heat shields 506 reflect lost heat energy back towards the centrifuge 204, conduct radiant energy to the jacket 502 for heat recapture, and provide additional protection to lower temperature components as with the end caps 504*a*/504*b*, thereby reducing the heat/energy requirements for the reactor 200, and thus improving the energy efficiency of the reactor 200.

In the example of FIG. 7, a bearing 508 is situated inside the top end cap 504*a*. A similar bearing could be used inside the bottom end cap 504*b*. In this example, because of the use of the jacket 502 acting as a heat sink as discussed above, the end cap 504*a*, and the optional additional heat shields 505/506, the bearing 508 need not necessarily comprise ultra high-temperature or in some cases high temperature materials and a conventional bearing 508 such as any bearing known in the art could be used. The bearing 508 in this example could be a fluid bearing like the fluid bearing 1216 discussed above, but in general, the bearing 508 is any bearing/rotary union that allows for rotation and fluid pass-through.

Figure 7A:
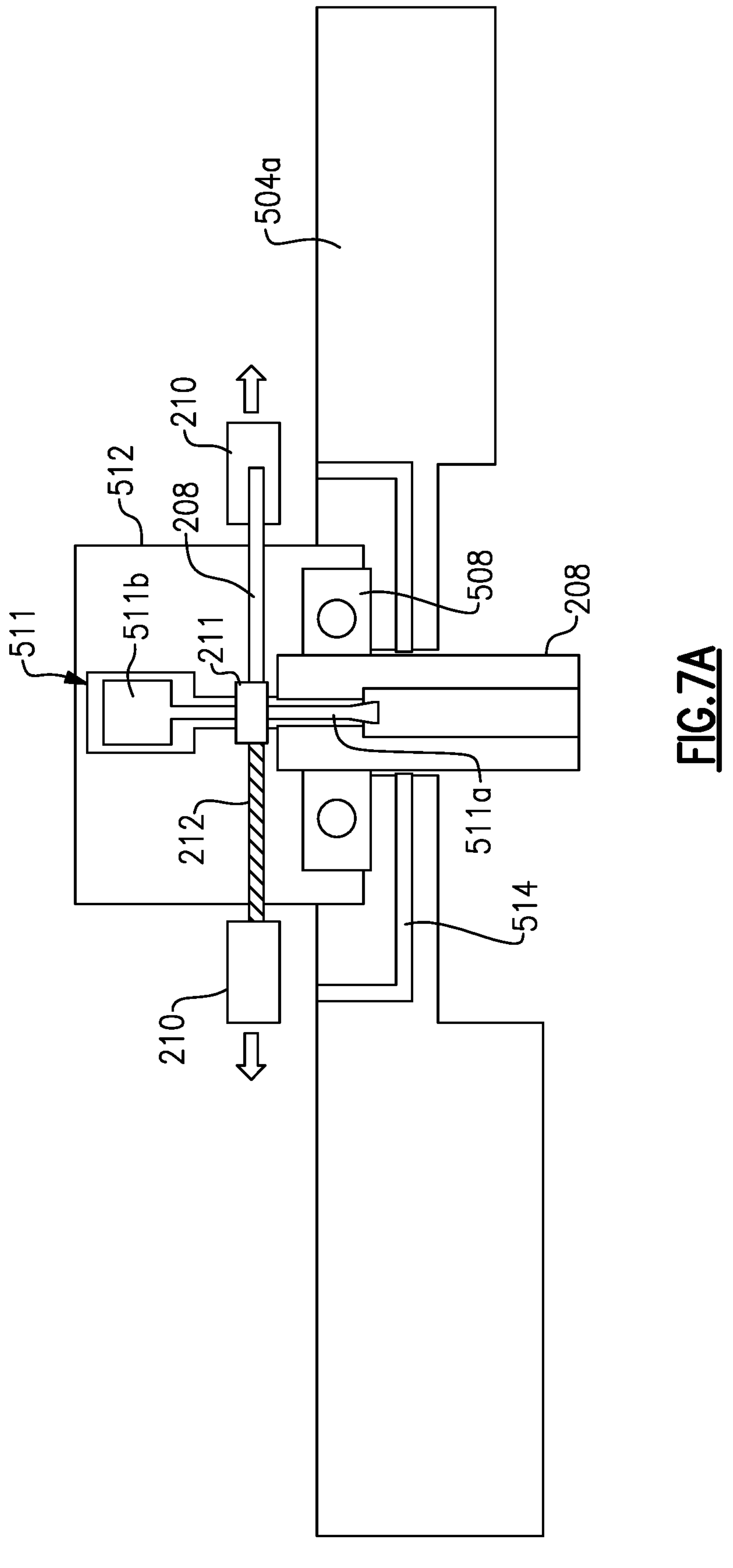
FIG. 7A schematically shows an example in-line valve system for the heat recapture system of FIG. 7.

FIG. 7A shows an example in-line valve system for outlet 208/top end cap 504*a*. In this example the bearing 508 is situated in a fluid end cap 512, which may comprise high temperature or ultra high-temperature materials as discussed above. A separator 211 separates an oxygen release line 212 from the outlet 208, each of which include a valve 210 as discussed above. A self-sealing valve 511 is situated in the fluid end cap 512. The fluid end cap 512 may be pressurized with an inert gas such as from pumping and pressure management system 218 in some examples. The self-sealing valve 511 includes a piston 511*a* that extends into the outlet 208 at the separator 211 and a valve head 511*b* connected to the piston 511*a*. Under operating conditions, high pressures inside the centrifuge 204 urge the valve head 511*b* to a closed position as shown in FIG. 7A in which the self-scaling valve 511 contributes to managing pressures along the outlet 208 and thereby reduces pressures at the valves 210 when the valves 210 are closed. The valve head 511*b* is configured to be actuated by any known sort of actuator, such as a magnetic actuator (not shown), against the pressures in the centrifuge 204 to an open position in which fluid can flow to/through the valves 210. In the open position the piston 511*a* is urged into the outlet 208 allowing fluid to flow around it and through the self-sealing valve 511. In this particular example, an optional liquid cooling and/or cryogenic loop 514 extends around the fluid end cap 512 through the top end cap 504*a*. The cooling loop may enable the use of lower-temperature material for the fluid end cap 512, bearing 508, and/or self-sealing valve 511.

Figure 7B:
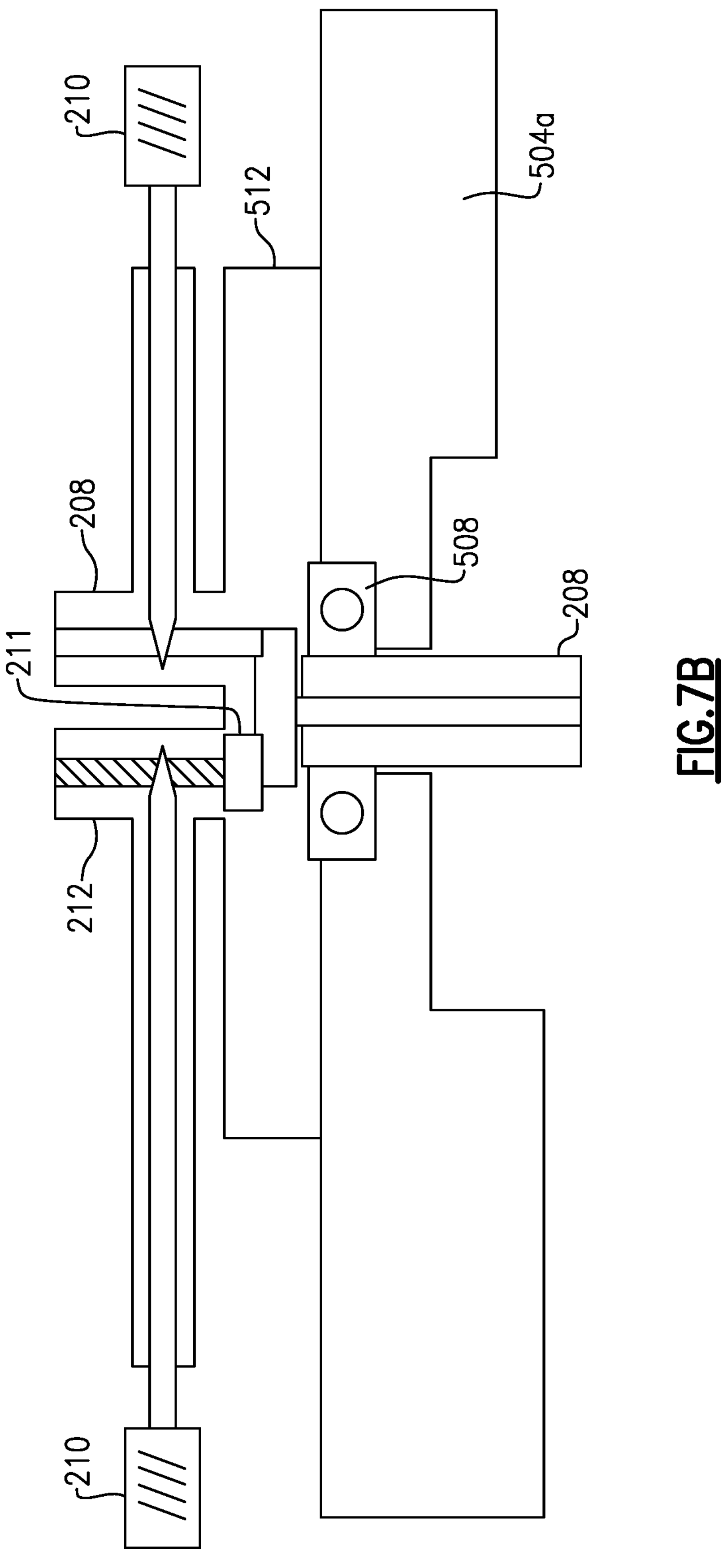
FIG. 7B schematically shows another example in-line valve system for the heat recapture system of FIG. 7.

FIG. 7B shows another example in-line valve system for outlet 208/top end cap 504*a*. In this example, valves 210 for each of the oxygen release line 212 and outlet 208 are situated inside or at least partly inside the fluid endcap 512.

The jacket 502 (illustrated in FIG. 7) in some examples comprises a series of pipes 510 operable to receive water from the water source (not shown). As the water flows through the pipes 510 it is preheated and then provided to the inlet 206. The pipe(s) 510 may include a valve 210 at its connection with the inlet 206 for controlling mixing of heated water with water in the inlet 206 and thus the temperature of water entering the crucible 204. In this way heat in the jacket 502 is used to preheat the water in some examples to a supercritical state, which allows for heat recycle within the system 100 and improves overall energy efficiency of the system 100.

In one example, the additional heat radiation shields 505 may be spaced apart from the end caps 504*a*/504*b* creating an insulative gap therebetween (FIG. 7). The gap may be under vacuum and/or be filled with an inert gas such as by pumping and pressure regulation system 218 discussed above. For instance, in the example of FIG. 7, there is a gap having a width d1 between the top end cap 504*a* and the adjacent heat shield 505. The gap serves as an insulative radiation gap and provides additional heat protection for the bearing 508 within the top end cap 504*a*. The width d1 of the gap as well as the thickness of the end cap 504*a* could be varied to provide the desired heat protection.

The system 100 operation will be described with reference to reactor 200 for brevity, however it should be understood that description of the system 100 operation is applicable to any of the examples discussed above.

In one example, the system 100 can be operated continuously. In this example, water is continuously provided to the centrifuge 204 via the inlet 206, while hydrogen is continuously removed via the outlet 208. Valves 210 control flowrate of the water and hydrogen back pressure (and in examples where a release line 212 and/or vents 209 are used, oxygen), which can be selected to provide the desired pressure within the centrifuge 204 and in turn optimize the purity of hydrogen in the outlet 208 and efficiency of the system 100. In a particular example, prior to continuous operation, during spin-up and heating of the centrifuge 204 by the energy source 300, the centrifuge 204 is charged with water via the inlet 206 but at this stage the valve 210 at the outlet 208 remains closed. After the centrifuge 204 is rotating at a desired speed, the temperature within the centrifuge 204 reaches water splitting temperatures as discussed above, and the centrifuge 204 spins for sufficient time to allow for separation of the constituents therein as discussed above, the valve 210 at the outlet 208 is opened to draw hydrogen from the centrifuge 204 as discussed above. Once the valve 210 at the outlet 208 is opened, the system 100 continues to operate continuously in a steady-state governed by input and output back pressure.

Figure 8:
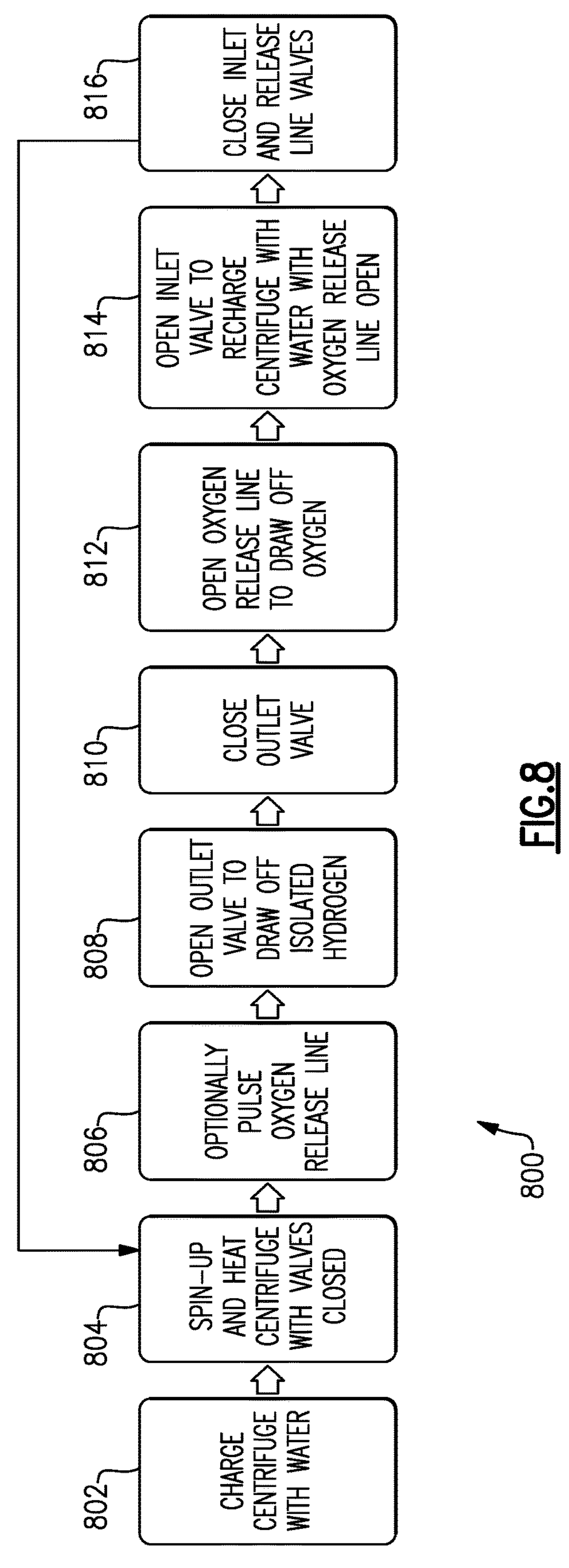
FIG. 8 schematically illustrates a method of isolating hydrogen using the system of FIGS. 1-7.

In another example, the system 100 operates in a non-continuous sequence. FIG. 8 schematically shows an example method 800 of isolating oxygen using the system 100. In step 802, the centrifuge 204 is charged with water via the inlet 206. In step 804, all valves 210 in the system 100 are closed as the centrifuge 204 undergoes spin-up and heating via the energy source 300 to water-splitting temperatures as discussed above. In this example, the system 100 includes an oxygen release line 212 with a valve 210 as shown in FIG. 3.

Once the centrifuge 204 reaches the desired temperature and speed and is operated for an amount of time necessary to cause separation of constituents as shown in FIG. 4 and described above, which may be a predetermined amount of time, in optional step 806, a valve 210 of the oxygen release line 212 is pulsed (opened then closed after a preset amount of time) which causes the outlet 208 to fill with hydrogen to the separator 211 and clears the oxygen release line 212 downstream of the separator 211. In step 808, a valve 210 of the outlet 208 is opened while the valve 210 of the oxygen release line 212 remains closed and hydrogen is drawn off through the outlet 208. In step 810, the valve 210 of the outlet 208 is closed. In one example, step 810 is performed at a time approximately when the hydrogen zone ($Z_H$, shown in FIG. 4 and described above) is empty, or in other words, when approximately all of the isolated hydrogen has entered the outlet 208. Therefore, the hydrogen in outlet 208 is approximately pure with no or minimal contamination of the hydrogen with oxygen/water.

In step 812, the valve 210 on the oxygen release line 212 is opened so oxygen and any recombined water left in the centrifuge 204 is drawn off from the centrifuge 204. In step 814, the valve 210 on the inlet 206 is opened to re-charge the centrifuge 204 with water while the valve 210 on the oxygen release line 212 remains open. In step 816, the valves 210 on the inlet 206 and oxygen release line 212 are closed. In one example, step 816 is performed at a time after the oxygen zone and recombination zone ($Z_O$ and $Z_R$, shown in FIG. 4 and described above) are substantially empty, or in other words, when approximately all of the oxygen and recombined water have entered the outlet 208, and some of the water from the inlet 206 enters the oxygen release line 212. The crucible 204 is re-charged and method 800 repeats at optional step 806. In this way, approximately pure hydrogen is produced by the system 100.

In some examples heating of the crucible 204 with heating system 300 may be reduced or stopped during certain steps of the method 800, such as while the crucible 204 is charged in step 802 and 814 to preserve energy input to the system.

In some examples, the valves 210 can be opened and closed by the control system 400 operable to open and close the valves 210. Such control systems are known in the art and will not be described in detail herein. The control system 400 may perform the method 800 steps of opening and closing the valves 210 at time intervals (which could be determined based on, for example, experimental data or modeling of the system 100). The time intervals, in some examples, may be predetermined time intervals, such as based on the experimental data or modeling of the system 100. In some examples, the time intervals may be based on characteristics of the system 100, such as temperature, an amount of water introduced, and/or the like.

The energy source 300 is shown schematically in FIG. 1. The description of the energy source 300 will be made with reference to the system shown in FIG. 1 however it should be understood that any of the examples discussed above could be used with the energy source 300. In one example, the energy source 300 is at least one laser (referred to herein as laser 300), such as a multi-kilowatt expanded beam fiber laser or direct diode laser, which are known in the art. The laser(s) 300 require power to generate a beam that supplies heat to the tower head 202. In a particular example, the laser 300 is powered at least in part by solar generated power. In this example, however, the laser 300 may also be configured to accept other power sources such as wind power or electrical power from batteries or an electrical power grid when solar power is not available (e.g., at night). In another example the energy source 300 may include a fusion or fission reactor.

The solar power may be provided by one or more arrays 302 of solar cells 304 (sometimes known as a "solar field") arranged near or around the isolation tower 202 and laser 300. In one example, one or more mirrors 306 may be included in the solar field. The mirrors are operable to direct light and heat from the solar field towards the reactor 200 and can be used instead of or in addition to the laser(s) 300.

The solar field may be mobile or semi-mobile, in some examples.

Operating parameters of the laser(s) 300 are selected to optimize efficiency of the system 100. For instance the wavelength of the beam emitted by the laser(s) 300 is selected based on the material of the protective chamber 202 and/or centrifuge 204 to maximize heat absorption into the water in the centrifugal centrifuge 204 and therefore efficiency of the system 100.

Likewise a lens/diffraction system 308 (which are known in the art) could be used to expand and deliver a beam from the laser(s) 300 to a selected finite area of the protective chamber 202. In particular, the lens/diffraction system 308 could be matched optically to the protective chamber 202 shape and distance between the protective chamber 202 and the laser 300. The lens/diffraction system 308 may include a collimator and/or an expander.

In a particular example the system 100 includes at least two lasers. A first laser **300*a* is operable to produce a beam for heating the protective chamber 202 as discussed above. One or more additional lasers 300*b* could be operable to produce additional beams for heating the protective chamber 202. In a particular example, the lasers 300*a*/300*b* are evenly spaced around the circumference of the protective chamber 202 for even heating of the protective chamber 202. Though in the example of FIG. 1 the lasers 300*a*/300*b* are shown directed at the bottom of the protective chamber 202, in other examples, the lasers 300*a*/300*b* are directed at the side and/or top of the protective chamber 202 such as in the example of FIG. 7**.

In a further example, one or more additional lasers **300*c* is operable to produce a beam for preheating water in the inlet 206** as discussed above.

As mentioned above, in some examples, the system 100 is mobile and is implemented in a vehicle such as a car, aircraft, truck, ship, spacecraft, or satellite. In other examples parts of the system 100 are stationary whereas others are mobile, for instance, the energy source 300 may be implemented in a stationary location and the reactor 200 may be implemented in a mobile vehicle that comes to the energy source 300 for heating of the reactor 200, or vice versa. The system 100 may alternatively be stationary.

Moreover, the system 100 may be used for just-in-time hydrogen production such as for a refueling station or other systems that require a hydrogen input. One example is systems that produce hydrogenated long-chain hydrocarbon fuel, which typically use as an input pressurized and preheated hydrogen.

As used herein, the terms "about" and "approximately" have the typical meanings in the art, however in a particular example "about" and "approximately" can mean deviations of up to 10% of the values described herein.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method of isolating hydrogen from water in a reactor, comprising:

charging a centrifuge with water via an inlet including an inlet valve, the centrifugal centrifuge situated in a protective chamber;

heating the centrifuge such that at least some of the water splits into hydrogen and oxygen;

rotating the centrifuge within the protective chamber such that the hydrogen and oxygen separate within the centrifuge according to their molecular mass; and drawing off at least some of the hydrogen from the centrifuge via an outlet including an outlet valve, and the inlet valve and the outlet valve are closed during the heating.

2. The method of claim 1, further comprising opening the outlet valve at a predetermined time interval after the heating.

3. The method of claim 2, further comprising closing the outlet valve at a predetermined time interval after opening the outlet valve.

4. The method of claim 3, wherein the hydrogen in the outlet is approximately pure.

5. The method of claim 1, further comprising drawing off the oxygen and recombined water from the centrifuge via an oxygen release line including an oxygen release valve.

6. The method of claim 5, wherein drawing off the oxygen and recombined water is performed after drawing off the hydrogen.

7. The method of claim 6, further comprising re-charging the centrifuge with water after drawing off the oxygen and recombined water.

8. The method of claim 7, wherein the oxygen release valve is open during the re-charging.

9. The method of claim 5, further comprising pulsing the oxygen release valve prior to drawing off the hydrogen.

10. The method of claim 1, wherein the heating is to a temperature of at least about 2200 degrees C.

11. The method of claim 10, wherein the heating to is to a temperature of at least about 4000 degrees C.

12. The method of claim 10, wherein drawing off the hydrogen is from an approximate radial center of the centrifuge.

13. The method of claim 1, further comprising preheating the water prior to the charging.

14. The method of claim 1, further comprising circularly accelerating the water prior to the charging.

15. The method of claim 1, wherein the protective chamber is under vacuum.

16. The method of claim 1, further comprising providing a noble gas to the centrifuge such that the noble gas forms a layer along a wall of the centrifuge.

17. The method of claim 1, wherein the heating is at least in part by a solar-powered laser.

18. The method of claim 1, further comprising moving the reactor from a first location to a second location.

19. A method of isolating hydrogen from water in a reactor, comprising:

charging a centrifuge with water via an inlet including an inlet valve, the centrifugal centrifuge situated in a protective chamber;

heating the centrifuge such that at least some of the water splits into hydrogen and oxygen;

rotating the centrifuge within the protective chamber such that the hydrogen and oxygen separate within the centrifuge according to their molecular mass;

drawing off at least some of the hydrogen from the centrifuge via an outlet including an outlet valve; and drawing off the oxygen and recombined water from the centrifuge via an oxygen release line including an oxygen release valve.

20. The method of claim 19, further comprising circularly accelerating the water prior to the charging, and providing a noble gas to the centrifuge such that the noble gas forms a layer along a wall of the centrifuge.

* * * * *